(12) United States Patent
Liu et al.

(10) Patent No.: US 12,294,873 B2
(45) Date of Patent: May 6, 2025

(54) REDUNDANT SESSION ESTABLISHMENT METHOD AND APPARATUS, RADIO BEARER ESTABLISHMENT METHOD AND APPARATUS, AND NODES, TERMINAL, AND MEDIUM

(71) Applicant: ZTE CORPORATION, Guangdong (CN)

(72) Inventors: Hongjun Liu, Guangdong (CN); Wei Ma, Guangdong (CN); Dongmei Li, Guangdong (CN); Boshan Zhang, Guangdong (CN); Wu Wen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 503 days.

(21) Appl. No.: 17/635,721

(22) PCT Filed: Sep. 28, 2020

(86) PCT No.: PCT/CN2020/118511
§ 371 (c)(1),
(2) Date: Feb. 16, 2022

(87) PCT Pub. No.: WO2021/032216
PCT Pub. Date: Feb. 25, 2021

(65) Prior Publication Data
US 2022/0286877 A1    Sep. 8, 2022

(30) Foreign Application Priority Data

Aug. 16, 2019  (CN) .......................... 201910759233.2

(51) Int. Cl.
*H04W 24/04*   (2009.01)
*H04W 76/15*   (2018.01)

(52) U.S. Cl.
CPC ........... *H04W 24/04* (2013.01); *H04W 76/15* (2018.02)

(58) Field of Classification Search
CPC ...... H04W 24/04; H04W 76/15; H04W 16/32
See application file for complete search history.

(56) References Cited

U.S. PATENT DOCUMENTS 10,993,138 B2 *  4/2021  Van Der Velde ..........................
                                        H04W 28/0268
11,477,833 B2 * 10/2022  Miklós .................... H04W 4/70
(Continued)

FOREIGN PATENT DOCUMENTS

CN    108282823 A    7/2018
CN    109246850 A    1/2019
(Continued)

OTHER PUBLICATIONS

First Office Action for Chinese Application No. 201910759233.2, mailed Apr. 28, 2023, 12 pages.
(Continued)

*Primary Examiner* — Redentor Pasia
(74) *Attorney, Agent, or Firm* — KDW Firm PLLC

(57) ABSTRACT

Provided are a redundant session establishment method and apparatus, a radio bearer establishment method and apparatus, a node, a terminal and a medium. The redundant session establishment method includes: generating redundant user plane resource information, and transmitting the redundant user plane resource information to a master node; and establishing a redundant session corresponding to a redundant session request in a redundant user plane resource according to the redundant session request from the master node, where the redundant session request is a request generated by the master node according to the redundant user plane resource information.

27 Claims, 6 Drawing Sheets

Generating redundant user plane resource information, and transmitting the redundant user plane resource information to a master node  — S110

Establishing a corresponding redundant session in a redundant user plane resource according to the redundant session request from the master node, where the redundant session request is a request generated by the master node according to the redundant user plane resource information  — S120

(56) References Cited

U.S. PATENT DOCUMENTS

| | | | | |
|---|---|---|---|---|
| 11,516,698 | B2* | 11/2022 | Godin | H04L 1/1642 |
| 11,863,372 | B2* | 1/2024 | Yoo | H04L 67/10 |
| 2019/0327642 | A1* | 10/2019 | Peng | H04W 28/08 |
| 2020/0178138 | A1* | 6/2020 | Han | H04W 76/27 |
| 2020/0336899 | A1* | 10/2020 | Li | H04W 12/106 |
| 2020/0404732 | A1* | 12/2020 | Shi | H04W 48/16 |
| 2021/0250788 | A1* | 8/2021 | Kim | H04W 24/04 |
| 2022/0060931 | A1* | 2/2022 | Han | H04W 76/12 |
| 2022/0060932 | A1* | 2/2022 | Ke | H04W 76/10 |
| 2022/0104296 | A1* | 3/2022 | Mary | H04W 76/15 |
| 2022/0150749 | A1* | 5/2022 | Ke | H04W 76/12 |
| 2023/0007715 | A1* | 1/2023 | Miklós | H04W 4/70 |
| 2023/0164861 | A1* | 5/2023 | Wang | H04W 76/15 370/328 |

FOREIGN PATENT DOCUMENTS

| | | | |
|---|---|---|---|
| CN | 110536332 | A | 12/2019 |
| WO | 2019031915 | A1 | 2/2019 |
| WO | 2019130048 | A1 | 7/2019 |

OTHER PUBLICATIONS

First Search Report for Chinese Application No. 201910759233.2, mailed Apr. 28, 2023, 5 pages.

ZTE., "Further Discussion on Higher Layer Multi-Connectivity" 3GPP TSG RAN WG3 NR#103 R3-190390, Athens, Greece, Feb. 25-Mar. 1, 2019.

Samsung., "Resource efficiency for redundant transmissions" 3GPP TSG-RAN WG3 #103bis R3-191566, Xi'an, China, Apr. 8-Apr. 12, 2019.

Ericsson, "Failure handling for redundancy based on dual connectivity" 3GPP TSG-SA WG2 Meeting #134 S2-1907075 Sapporo, Japan, Jun. 24-28, 2019.

OPPO, "Discussion on the PDU session association to MN or SN for URLLC" 3GPP TSG-SA WG2 Meeting #131 S2-1901635 Tenerife (Spain), Feb. 25-Mar. 1, 2019.

International Search Report for the International Patent Application No. PCT/CN2020/118511, mailed Dec. 30, 2020, 2 pages.

* cited by examiner

REDUNDANT SESSION ESTABLISHMENT METHOD AND APPARATUS, RADIO BEARER ESTABLISHMENT METHOD AND APPARATUS, AND NODES, TERMINAL, AND MEDIUM

CROSS-REFERENCE TO RELATED APPLICATIONS

This is a National Stage Application, filed under 35 U.S.C. 371, of International Patent Application No. PCT/CN2020/118511, filed on Sep. 28, 2020, which is based on and claims priority to Chinese Patent Application No. 201910759233.2, filed with the China National Intellectual Property Administration (CNIPA) on Aug. 16, 2019, disclosures of which are incorporated herein by reference in their entireties.

TECHNICAL FIELD

The present application relates to the field of wireless communications, and for example, a redundant session establishment method and apparatus, a radio bearer establishment method and apparatus, a node, a terminal and a medium.

BACKGROUND

Ultra-reliable and low latency communication (URLLC) is one of three major application scenarios of the 5th-generation (5G) wireless communication technology. In order to improve the reliability of the 5G wireless communication technology, the third generation partnership project (3GPP) standard organization has proposed a solution for a redundant user plane path based on a dual connectivity. However, in a dual-connectivity architecture or a multi-connectivity architecture, a master node (MN) is agnostic to a number of distributed units (DU) included in a secondary node (SN), and only one redundant session may be established on the SN, or user data of only one redundant session may be sent on the SN.

SUMMARY

The present disclosure provides a redundant session establishment method and apparatus, a radio bearer establishment method and apparatus, a node, a terminal and a medium, so as to improve the reliability of a data transmission in the 5G wireless communication technology.

An embodiment of the present application provides a redundant session establishment method. The redundant session establishment method includes: generating redundant user plane resource information, and transmitting the redundant user plane resource information to a master node; and establishing a redundant session corresponding to a redundant session request in a redundant user plane resource according to the redundant session request from the master node, where the redundant session request is a request generated by the master node according to the redundant user plane resource information.

An embodiment of the present application further provides a redundant session establishment method. The redundant session establishment method includes: receiving redundant user plane resource information of a secondary node transmitted by the secondary node; and generating a redundant session request according to the redundant user plane resource information, and sending the redundant session request to the secondary node, so that the secondary node establishes a redundant session corresponding to the redundant session request in a redundant user plane resource.

An embodiment of the present application further provides a radio bearer establishment method. The redundant session establishment method includes: establishing radio bearers with a distribution unit of a master node or a secondary node according to an indication of the master node or the secondary node, where the radio bearers are in one-to-one correspondence with redundant sessions.

An embodiment of the present application further provides a redundant session establishment apparatus. The redundant session establishment apparatus includes a redundant user plane resource information sending module and a redundant session establishment module. The redundant user plane resource information sending module is configured to generate redundant user plane resource information, and transmit the redundant user plane resource information to a master node. The redundant session establishment module is configured to establish a redundant session corresponding to a redundant session request in a redundant user plane resource according to the redundant session request from the master node, where the redundant session request is a request generated by the master node according to the redundant user plane resource information. An embodiment of the present application further provides a redundant session establishment apparatus. The redundant session establishment apparatus includes a redundant user plane resource information receiving module and a redundant session request establishment module. The redundant user plane resource information receiving module is configured to receive redundant user plane resource information of a secondary node transmitted by the secondary node.

The redundant session request establishment module is configured to generate a redundant session request according to the redundant user plane resource information, and send the redundant session request to the secondary node, so that the secondary node establishes a redundant session corresponding to the redundant session request in a redundant user plane resource.

An embodiment of the present application further provides a radio bearer establishment apparatus. The radio bearer establishment apparatus includes a radio bearer establishment module. The radio bearer establishment module is configured to establish radio bearers with a distribution unit of a master node or a secondary node according to an indication of the master node or the secondary node, where the radio bearers are in one-to-one correspondence with redundant sessions.

An embodiment of the present application further provides a secondary node. The secondary node includes one or more processors and a storage apparatus. The storage apparatus is configured to store one or more programs. The one or more programs, when executed by the one or more processors, cause the one or more processors to implement the redundant session establishment method applied to the secondary node described in the embodiments of the present application.

An embodiment of the present application further provides a master node. The master node includes one or more processors and a storage apparatus. The storage apparatus is configured to store one or more programs. The one or more programs, when executed by the one or more processors, cause the one or more processors to implement the redundant session establishment method applied to the master node described in the embodiments of the present application.

An embodiment of the present application further provides a terminal. The terminal includes one or more processors and a storage apparatus. The storage apparatus is configured to store one or more programs. The one or more programs, when executed by the one or more processors, cause the one or more processors to implement the radio bearer establishment method described in the embodiments of the present application.

An embodiment of the present application further provides a storage medium. The storage medium stores a computer program. The computer program, when executed by a processor, implements any one of the methods provided in the embodiments of the present application.

DETAILED DESCRIPTION

Embodiments of the present application will be described hereinafter with reference to the accompanying drawings.

Before the embodiments provided in the present application is described, a redundant session is firstly exemplarily explained.

A mobile communication system includes a mobile user equipment (UE) and a network device, where the network device includes a radio access network (RAN) device and a core network (CN) device. The RAN device includes: 1 or more cell groups, or 1 or more base stations, or 1 or more Node Bs (NBs).

In a 5G system, the CN device refers to a 5G Core network (5GC) device, which includes an access and mobility management function (AMF), a user plane function (UPF), a system management function (SMF), and the like.

Figure 1:
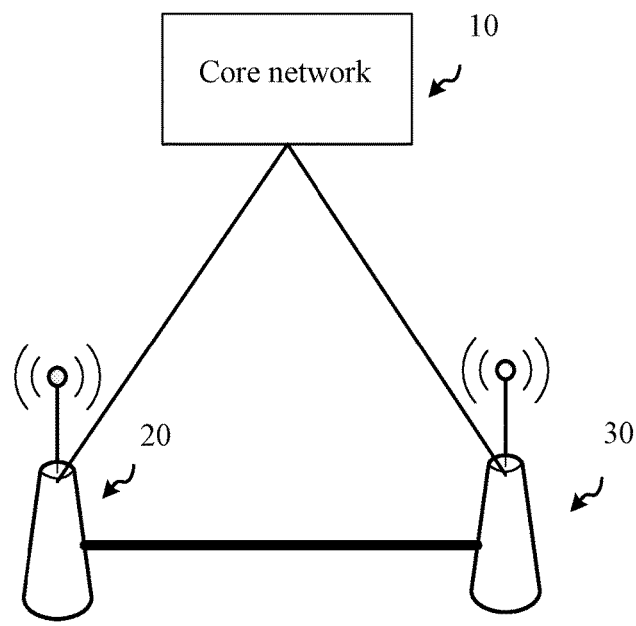
FIG. 1 is a schematic diagram of a dual-connectivity network architecture.

In a dual connectivity (DC) system, the UE establishes two or more connections with the network device. As shown in FIG. 1, in the dual connectivity system, a core network 10 (or a UPF network element of the core network) establishes a connection with a cell group 20 and a cell group 30 of a radio access network, respectively. In this case, the radio access network includes one master node (MN) and one secondary node (SN), for example, the cell group 20 is the MN, and the cell group 30 is the SN.

Figure 2:
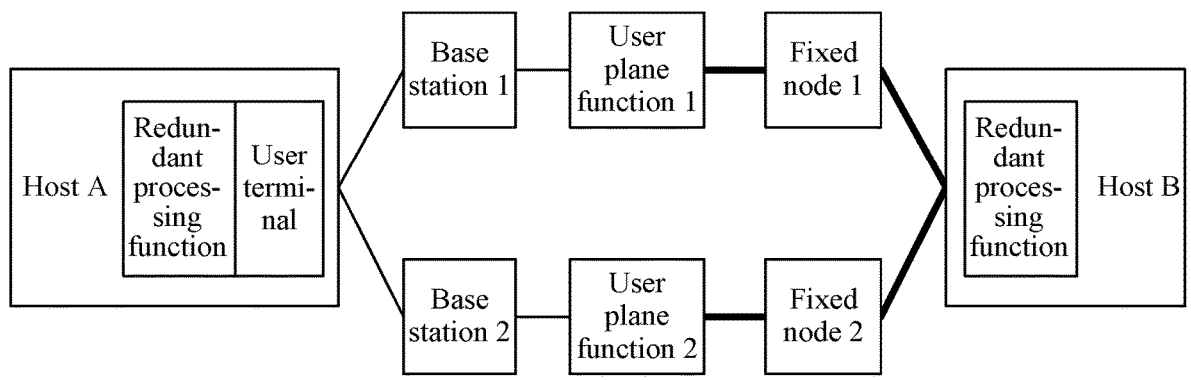
FIG. 2 is a diagram showing a scheme of a redundant user plane path based on a dual-connectivity.

A URLLC is one of three major application scenarios of the 5G technology. According to the 3GPP TR23.725, a solution based on redundant user plane paths of dual connectivity is proposed, the content of the solution is shown in FIG. 2, and the detailed content may be seen in the description of the 3GPP protocol.

Figure 3:
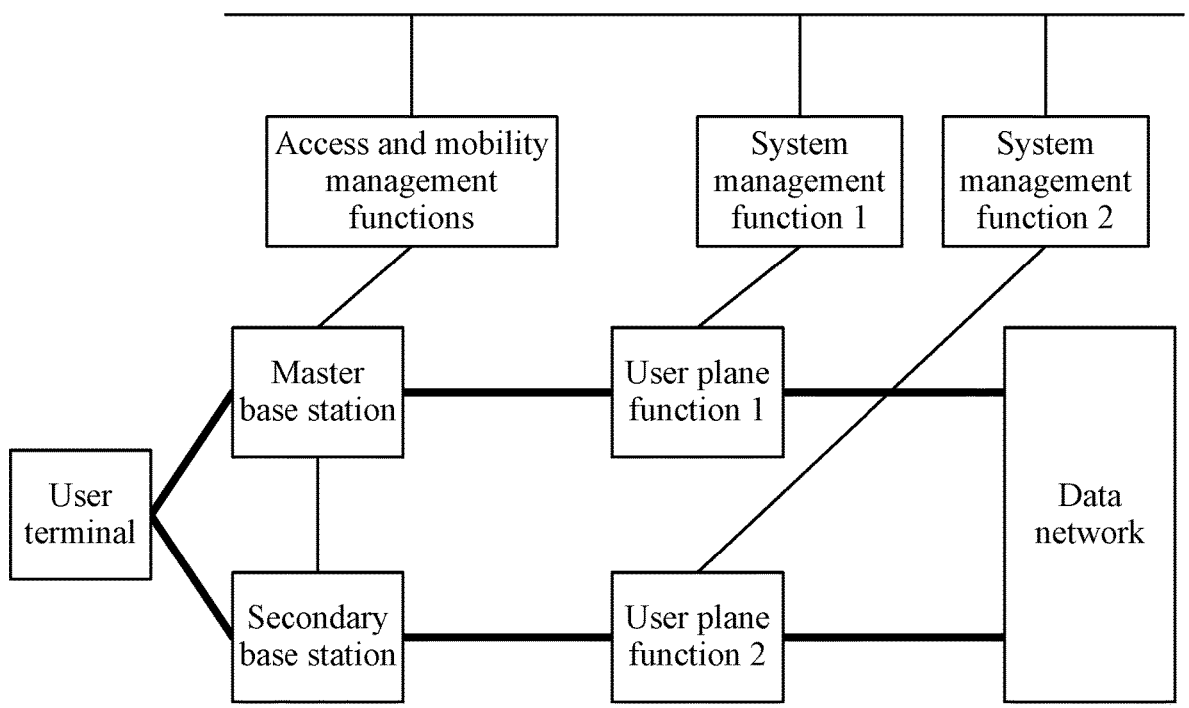
FIG. 3 is a diagram showing a scheme of a redundant user plane path based on a dual-connectivity.

As shown in FIG. 3, a user equipment (UE) starts to establish two redundant protocol data unit sessions (Redundant PDU sessions), configures different data network names (DNNs) and single-network slice selection assistance information (S-NSSAI) combinations for each session, and establishes the combinations on a master base station and a secondary base station respectively. A system management function 1 (SMF1) and a system management function 2 (SMF2) decide whether the redundant session may be established. The basis for making the decisions of the SMF1 and the SMF2 is: the S-NSSA, the DNN, a user authorization, a local policy configuration, and the like. The SMF1 and the SMF2 adopt a redundant sequence number (RSN) to distinguish the redundant session, and adopt a master base station (Master NG-RAN) and the secondary base station (Secondary NG-RAN) to respectively send user plane data. As shown in FIG. 3, a user plane for one redundant session is established on a user plane function 1 (UPF 1) and a user plane for another redundant session is established on a user plane function 2 (UPF 2). The configuring or establishing the redundant session on the master base station or the secondary base station referred to in the present application means that the user data of the redundant session is sent on the master base station or the secondary base station.

When the CN (e.g., 5GC) requests the RAN to establish the redundant session, the CN will carry a RSN parameter for the redundant session. That is, a RSN parameter is included in a configuration parameter of the redundant session, and is sent to the RAN (e.g., NG-RAN of 5G) through a control plane interface (e.g., a NG interface of 5G) between the CN and the RAN.

A dual-connection architecture on an RAN side includes two network element nodes of MN and SN, a redundant session establishment request is sent from the core network to the MN, and the MN establishes the redundant session on the MN or the SN according to the RSN parameter of the redundant session. For example, a redundant session with RSN=1 is established on the MN, and a redundant session with RSN=2 is established on the SN.

Likewise, a multi-connection architecture on the RAN-side includes only one MN, i.e., one MN and multiple SNs, the MN may establish redundant sessions with different RSN parameters onto different RAN nodes. For example, the redundant session with RSN=1 is established on the MN and the redundant session with RSN=2 is established on one SN. For example, redundant sessions with RSN=1 and RSN=2 are established on two SNs, respectively, without establishing the redundant session on the MN.

Figure 4:
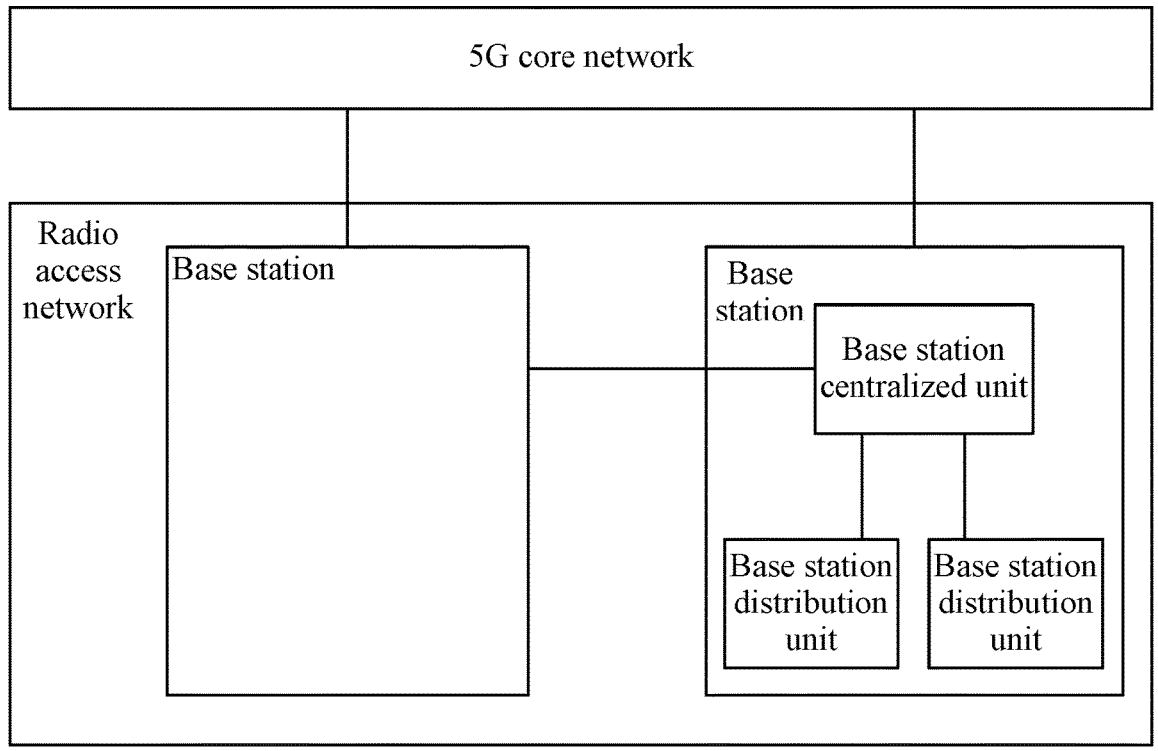
FIG. 4 is a schematic diagram of a centralized unit-distributed unit architecture based on a dual-connectivity.

As shown in FIG. 4, a base station (gNB) at a radio access network (RAN) side adopts a centralized unit-distributed unit (CU-DU) architecture, and one gNB central unit (gNB CU) includes one or more gNB distributed units (gNB DUs), two base station distributed units (gNB DUs) is used as an example in FIG. 4. After a redundant establishment request is received by the gNB CU at the RAN side, sessions with RSN=1 and RSN=2 are established on two gNB DUs respectively when the gNB CU includes two gNB DUs, and the sessions with RSN=1 and RSN=2 are established on two of the gNB DUs respectively when the gNB CU includes multiple gNB DUs, and the RAN node may only establish the redundant sessions with RSN=1 or RSN=2 when the gNB CU includes only one gNB DU.

Figure 5:
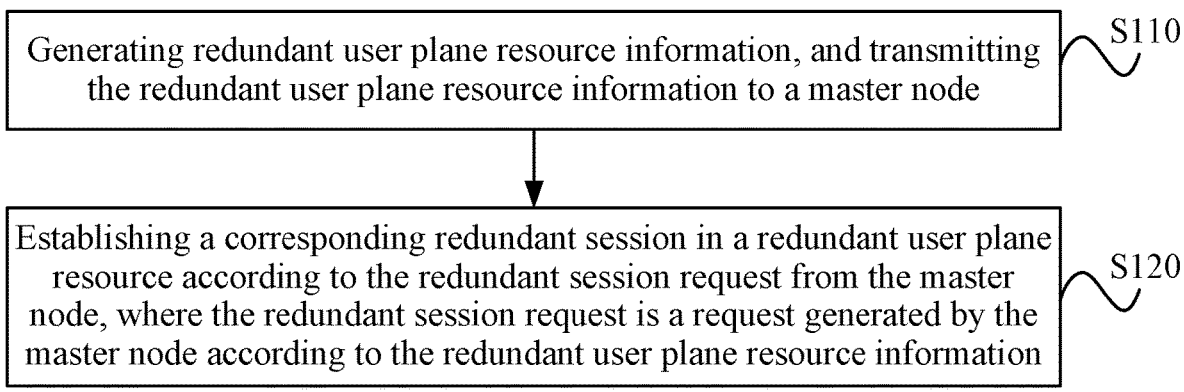
FIG. 5 is a flowchart of a redundant session establishment method provided in the present application.

In the above dual-connection architecture, the multi-connection architecture or the CU-DU architecture, each network element (MN or SN or DU) has independent user plane resources dedicated to itself. Redundant sessions are respectively established to different network elements (such as MN, SN and DU) according to RSN, so that the reliability of the redundant sessions may be improved. For example, the redundant session with the RSN=1 fails, the redundant session with the RSN=2 may still work normally, and then the redundant session may still work normally. In an exemplary embodiment, FIG. 5 is a flowchart of a redundant session establishment method provided in the present application. The method may be applicable to situations where a redundant session is established in dual-connectivity and multi-connectivity architectures. The method may be executed by a redundant session establishment apparatus applied to a secondary node provided in the present application, the redundant session establishment apparatus may be implemented by software and/or hardware and integrated in the secondary node, and the secondary node may refer to a secondary base station in a radio access network.

As shown in FIG. 5, the redundant session establishment method provided in the present application includes S110 and S120.

In S110, redundant user plane resource information is generated, and the redundant user plane resource information is transmitted to a master node.

A redundant user plane resource (RUPR) refers to a user plane resource that establishes the redundant session. The redundant user plane resource information refers to information generated according to a number of RUPRs of the secondary node and is used for the secondary node to indicate the number of RUPRs of the secondary node to the master node.

In an example, generating the redundant user plane resource information includes: determining a number of redundant user plane resources; and generating the redundant user plane resource information according to the number of redundant user plane resources.

In an example, the number of redundant user plane resources includes: a number of distribution units; or a first set value corresponding to a first target number range to which a number of distribution units belongs; or a minimum value of a number of distributed units and a number of centralized unit control planes; or a second set value corresponding to a second target number range to which a minimum value belongs.

For one RAN network element adopting a CU-DU architecture, if the network element has N DUs, theoretically the RAN network element may have N RUPRs, with one RUPR on each DU. When an RAN node adopts the CU-DU architecture, one RAN node has one CU and multiple DUs, each DU has its own independent radio link control (RLC), media access control (MAC) and physical layer, i.e., each DU has its own independent user plane resource.

Figure 6:
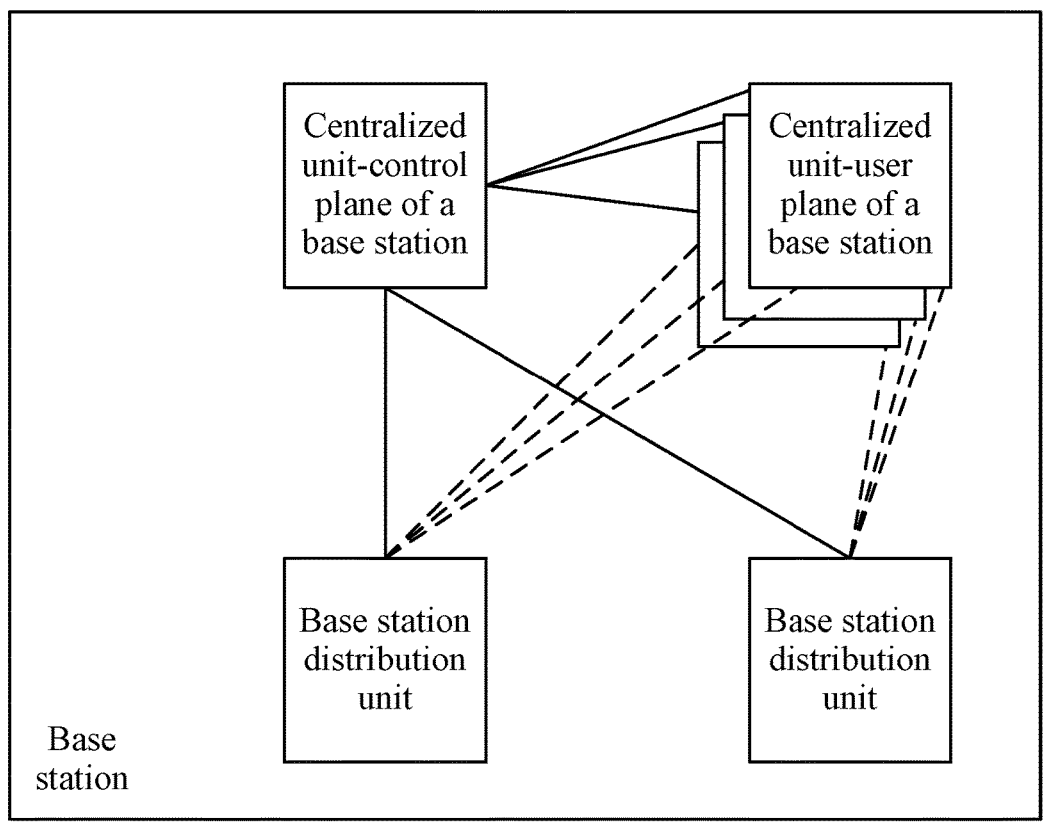
FIG. 6 is a schematic diagram of an architecture with a centralized unit-control plane and centralized unit-user plane being separated.

As shown in FIG. 6, one RAN node has only one CU, and if the CU adopts a CU-Control Plane (CU-CP) and CU-User Plane (CU-UP) separated architecture, the CU may have multiple independent CU-UPs. At this time, each CU-UP has its own independent packet data convergence protocol (PDCP) and service data adaptation protocol (SDAP), i.e., each CU-UP has its own independent user plane resource.

When one RAN node (e.g., gNB) adopts the CU-DU architecture, the user plane resource includes PDCP and SDAP on the CU, RLC, MAC and physical layer on the DU.

Therefore, the RAN node (e.g., gNB) adopting the CU-DU architecture may determine the number of RUPRs that the RAN node has in several manners as follows.

(1) A number of RUPRs included in the node may be determined according to a number of DUs included in the node without considering whether the CU adopts the CU-CP and CU-UP separated architecture or without considering a number of CU-UPs included in the CU, i.e., the number of RUPRs=the number of DUs.

(2) The number of RUPRs is determined as a first set value corresponding to a first target number range to which the number of the distribution units belongs according to the first target number range to which the number of distribution units belongs without considering whether the CU adopts a CU-CP and CU-UP separated architecture or not and without considering the number of CU-UPs of the CU. For example, when the number of DUs=1, a number of RUPRs=2; and when the number of DUs≥2, the number of RUPRs=2.

(3) The number of RUPRs is determined as =min {the number of CU-UPs, the number of DUs} according to the number of CU-UPs and the number of DUs.

(4) The number of RUPRs is determined as a second set value corresponding to the second target number range to which the min {the number of CU-UPs, the number of DUs} belongs according to a second target number range to which the min {the number of CU-UPs, the number of DUs} belongs. For example, when min {the number of CU-UPs, the number of DUs}=1, the number of RUPRs=1; when min {the number of CU-UPs, the number of DUs}≥1, the number of RUPRs=2.

After the secondary node determines the number of RUPRs according to the manner of determining the number of RUPRs, corresponding RUPR information is generated, and information sent to the master node by the secondary node is transmitted to the master node.

In an example, transmitting the redundant user plane resource information to the master node includes: transmitting the redundant user plane resource information to the master node through a message sent to the master node by the secondary node, where the message sent to the master node by the secondary node is sent through an interface between the master node and the secondary node.

For example, the message sent by the secondary node to the master node through an Xn interface of the 5G includes redundant user plane resource information of the secondary node.

If one RUPR is included in the secondary node, the RUPR information is not sent to the master node, and the master node defaults that one RUPR is included in the secondary node.

In an example, the redundant user plane resource information includes any one of: a number of redundant user plane connections allowed to be established by a secondary node, a number of redundant user plane bearers allowed to be established by the secondary node, or a number of redundant sessions allowed to be established by the secondary node and having a redundant serial number as a set sequence value.

That is, the redundant user plane resource information sent by the SN means that the SN may establish one or more redundant user plane connections, or the SN may establish one or more redundant user plane bearers, or the SN may establish one or more redundant sessions with RSN values.

In S120, a corresponding redundant session is established in a redundant user plane resource according to the redundant session request from the master node, where the redundant session request is a request generated by the master node according to the redundant user plane resource information.

After the master node receives the RUPR information transmitted by the secondary node, a number of RUPRs of the secondary node is determined according to the redundant user plane resource information, and the redundant session request is generated according to the number of RUPRs of the secondary node.

In an example, the redundant session request is sent by the master node through an SN addition request message or an SN modification request message.

In an example, identification information of the redundant session is included in the redundant session request. The identification information of the redundant session is used for identifying that the session is the redundant session, and is specifically used for the secondary node to establish the corresponding redundant session in the redundant user plane resource according to the identification information of the redundant session.

After the secondary node receives the redundant session request sent by the master node, a redundant session corresponding to the redundant session request is established in the RUPR.

In an example, establishing the corresponding redundant session in the redundant user plane resource according to the redundant session request from the master node includes: establishing the corresponding redundant session in the redundant user plane resource according to the identification information of the redundant session in the redundant session request.

In an example, establishing the corresponding redundant session in the redundant user plane resource according to the redundant session request from the master node includes: in response to determining that only one redundant session is established in the redundant user plane resource according to the redundant session request, establishing the redundant session in any one of the redundant user plane resources.

If the master node determines that only one redundant session is established in the secondary node, then the secondary node may establish this redundant session in any one RUPR of the multiple RUPRs when the secondary node has multiple RUPRs.

In an example, when the master node determines to establish at least two sessions in the redundant user plane resource of the secondary node, the redundant session request further includes a redundant serial number value of a redundant session.

The redundant serial number value of the redundant session is used for the secondary node to establish the corresponding redundant session in a redundant user plane resource matched with the redundant serial number value of the redundant session.

In an example, establishing the corresponding redundant session in the redundant user plane resource according to the redundant session request from the master node includes: establishing the corresponding redundant session in the redundant user plane resource matched with the redundant serial number value of the redundant session according to the identification information of the redundant session in the redundant session request and the redundant serial number value of the redundant session.

If the redundant session request sent by the master node includes the redundant serial number value of the redundant session, the secondary node establishes the redundant session in the RUPR matched with the redundant serial number value.

If the master node determines that the number of RUPRs of the secondary node is equal to one through the RUPR information, then the generated redundant session request is configured for instructing the secondary node to establish one redundant session in the redundant user plane resource; and if the master node determines that the number of RUPRs of the secondary node is equal to or greater than two through the RUPR information, the generated redundant session request is configured for instructing the secondary node to establish at least one redundant session in the redundant user plane resource.

According to the redundant session establishment method provided in the present application, the master node may determine the number of RUPRs of the secondary node through the RUPR information transmitted by the secondary node, and then one or more redundant sessions may be established in the secondary node according to the number of RUPRs, so that the reliability of the redundant sessions is ensured, and the reliability of the data transmission in the 5G wireless communication technology is improved.

In the present application, each of multiple redundant user plane connections, multiple redundant user plane bearers, and multiple RSN values being "2" are explained as an example (without limitation, a number greater than or equal to 2 is meant). For example, one RSN value refers to RSN=1 or RSN=2, and multiple RSN values refer to RSN=1 and RSN2. A redundant session in which the SN may establish one RSN value means that the SN may establish a redundant session with RSN=1 or establish a redundant session with RSN=2; a redundant session in which the SN may establish two RSN values means that the SN may establish a redundant session with RSN=1 and also may establish a redundant session with RSN=2.

When the number of RUPRs is 1 or 2, RUPR information of the SN means that the SN may establish one or two redundant user plane connections, or the SN may establish one or two redundant user plane bearers, or the SN may establish a redundant session of one or two RSN values.

The number of RUPRs of a network element is defaulted to 1, i.e., a redundant session with only one RSN value (RSN=1 or RSN=2) may be established on the network element. That is, when the RUPR information of the SN is not transmitted through a message sent by the SN to the MN (the MN does not acquire the RUPR information through the message sent by the SN), the MN defaults that the number of RUPRs of the SN is equal to 1. Alternatively stated, when a number of RUPRs of the SN is equal to 1, the SN does not need to carry the RUPR information through a message sent to the MN.

The RUPR information of the SN may be represented by RUPR information={1 or 2}, and when the RUPR information of the SN is 1, then the SN may only establish a redundant session with one RSN value (RSN=1 or RSN=2); when the RUPR information of an SN is 2, then the SN may establish a redundant session with one RSN value (RSN=1 or RSN=2) or two RSN values (RSN=1 and RSN=2).

The messages sent by the SN to the MN may be sent through an Xn interface between the MN and the SN. That is, the RUPR information is carried in the message sent through the Xn interface between the MN and the SN.

After the MN receives the RUPR information of the SN, the MN may obtain the number of RUPRs of the SN, which includes that the SN may only establish the redundant session with RSN=1 (or RSN=2), or the SN may establish redundant sessions with RSN=1 and RSN=2.

The MN establishes one or more redundant sessions over the SN, including the following scenarios.

(1) When the SN has one redundant user plane resource, the MN configures a redundant session with one RSN value (such as RSN=1) to the MN itself, and configures a redundant session with another RSN value (such as RSN=2) to the SN.

(2) When the SN has two redundant user plane resources, the MN configures a redundant session with one RSN value (such as RSN=1) to the MN itself, and configures a redundant session with another RSN value (such as RSN=2) to the SN. The SN establishes a redundant session with the RSN=2 in the redundant user plane resource matched with the RSN=2 or establishes the redundant session with the RSN=2 in any one of redundant user plane resources (at this time, the MN allows the SN to establish the redundant session in any one of the redundant user plane resources, e.g., the RSN value of the redundant session is not included in the redundant session request).

(3) When the SN has two redundant user plane resources, the MN configures redundant sessions with two RSN values (such as RSN=1 and RSN=2) to the SN. The SN establishes a redundant session with RSN=1 in a redundant user plane resource matched with the RSN=1, and establishes a redundant session with RSN=2 in a redundant user plane resource matched with the RSN=2.

For the above situation (1), since there is only one redundant user plane resource on the SN, the SN may only establish a redundant session with one RSN value; for the above situation (2), since a redundant session with one RSN value is established on the MN, only a redundant session with one RSN value may be established on the SN. Therefore, the method for the MN to request the SN to establish a redundant session is the same for both situations.

The MN knows that the SN may establish one or two redundant sessions, and the MN decides to establish a redundant session with an RSN value (e.g., RSN=1) and establishes another redundant session with an RSN value (e.g., RSN=2) on the SN. The MN sends a redundant session request to the SN, the redundant session request includes related information for requesting to establish one redundant session. The related information for requesting to establish one redundant session includes identification information of the redundant session and is used for identifying that the session is the redundant session. The related information for requesting to establish one redundant session allows the redundant session to be established in any 1 redundant user plane resource of SN, and the related information for requesting to establish one redundant session does not include the RSN value of the redundant session.

The SN receives a redundant session request sent by the MN, where the redundant session request includes related information for requesting to establish one redundant session. If the related information for requesting to establish one redundant session includes the identification information of the redundant session, the SN establishes the redundant session in a redundant user plane resource of the SN.

When the related information for requesting to establish one redundant session includes any one redundant user plane resource (for example, the RSN value of the redundant session is not included) allowing the redundant session to be established in the SN, if the SN has multiple redundant user plane resources (for example, two redundant user plane resources), the SN may establish the redundant session in any one redundant user plane resource.

For the above situation (3), since there are two redundant user plane resources on the SN, the SN may establish a redundant session with two RSN values.

The MN knows that the SN may establish two redundant sessions, and the MN decides to establish a redundant session with two RSN values (i.e., RSN=1 and RSN=2) at the SN. The MN sends a redundant session request to the SN, where the redundant session request includes related information for requesting to establish two redundant sessions. Where the related information requesting to establish the two redundant sessions includes not only the identification information of the redundant session, but also RSN values of the redundant session (namely RSN=1 and RSN=2).

The SN receives a redundant session request sent by the MN, where the redundant session request includes related information for requesting to establish two redundant sessions. The related information for requesting to establish the two redundant sessions not only includes the identification information of the redundant session, but also includes RSN values (RSN=1 and RSN=2) of the redundant session, then the SN establishes the redundant sessions in a redundant user plane resource corresponding to the RSN value of the SN itself, such as the redundant session with the RSN=1 is established in a redundant user plane resource with a serial number of SN-RUPR-1 of the SN, and the redundant session with the RSN=2 is established in a redundant user plane resource with a serial number of SN-RUPR-2 of the SN.

In an example, after the corresponding redundant session is established in the redundant user plane resource, the method further includes: a response message matched with the redundant session request is fed back to the master node; where the response message is configured for indicating whether the redundant session corresponding to the redundant session request is successfully established.

After the SN establishes the redundant session corresponding to the redundant session request in the redundant user plane resource, the response message matched with the redundant session request is sent to the MN, and the response message includes related information of establishment success and/or establishment failure of one or more redundant sessions.

In an example, after the corresponding redundant session is established in the redundant user plane resource, the method further includes: radio bearers are established with the terminal through at least one distribution unit, where the radio bearers are in one-to-one correspondence with redundant sessions.

In a case where the SN establishes one redundant session, the MN and the SN respectively establish one radio bearer with the terminal, and the service data of the redundant user plane resource are borne through the radio bearer. The radio bearer established by the MN corresponds to the redundant session established by the MN, and the radio bearer established by the SN corresponds to the redundant session established by the SN.

In a case where the SN establishes multiple redundant sessions, the SN establishes multiple radio bearers with the terminal through multiple DUs included in the SN, respectively, and bears the service data of the redundant user plane resource through the radio bearers. The multiple radio bearers established by the SN are in one-to-one correspondence with the multiple redundant sessions established by the SN, respectively.

Figure 7:
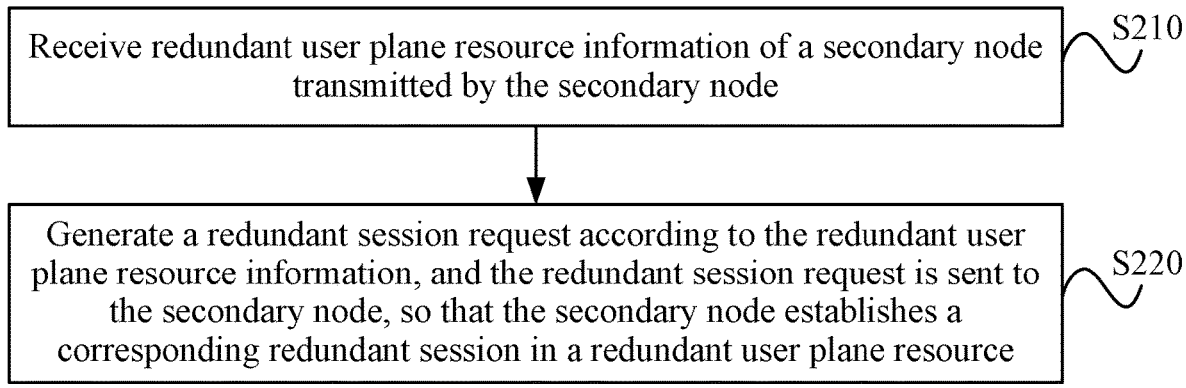
FIG. 7 is a flowchart of a redundant session establishment method provided in the present application.

In an exemplary embodiment, FIG. 7 is a flowchart of a redundant session establishment method provided in the present application. The method may be applicable to situations where redundant sessions are established in dual-connectivity and multi-connectivity architectures. The method may be executed by the redundant session establishment apparatus applied to the master node provided in the present application, the redundant session establishment apparatus may be implemented by software and/or hardware and integrated in the master node, and the master node may refer to a master base station in a wireless access network.

As shown in FIG. 7, the redundant session establishment method provided in the present application includes S210 and S220.

In S210, redundant user plane resource information of a secondary node transmitted by the secondary node is received.

The redundant user plane resource information refers to information generated according to the number of RUPRs of the secondary node and is used for the secondary node to indicate the number of RUPRs of the secondary node to the master node.

In an example, receiving the redundant user plane resource information of the secondary node transmitted by the secondary node includes: receiving the redundant user plane resource information of the secondary node transmitted by the secondary node through a message sent to a master node, where the message sent by the secondary node to the master node is sent through an interface between the master node and the secondary node.

For example, the message sent by the secondary node to the master node through an Xn interface of the 5G includes the redundant user plane resource information of the secondary node.

The secondary node generates the redundant user plane resource information according to the number of redundant user plane resources of the secondary node.

In an example, the number of redundant user plane resources of the secondary node includes: a number of distribution units; or a first set value corresponding to a first target number range to which a number of distribution units belongs; or a minimum value of a number of distributed units and a number of centralized unit control planes; or a second set value corresponding to a second target number range to which a minimum value belongs.

In an example, transmitting the redundant user plane resource information to the master node by the secondary node includes: transmitting, by the secondary node, the redundant user plane resource information to the master node through a message sent to the master node by the secondary node, where the message sent to the master node by the secondary node is sent through an interface between the master node and the secondary node.

For example, the message sent by the secondary node to the master node through an Xn interface of the 5G includes the redundant user plane resource information of the secondary node.

If the secondary node has one RUPR, the secondary node may not send the RUPR information to the master node, and at this time, the master node defaults that the secondary node has one RUPR.

In an example, the redundant user plane resource information includes any one of: a number of redundant user plane connections allowed to be established by a secondary node, a number of redundant user plane bearers allowed to be established by the secondary node, or a number of redundant sessions allowed to be established by the secondary node and having a redundant serial number as a set sequence value.

That is, the redundant user plane resource information sent by the SN means that the SN may establish one or more redundant user plane connections, or the SN may establish one or more redundant user plane bearers, or the SN may establish a redundant session with one or more RSN values.

In S220, a redundant session request is generated according to the redundant user plane resource information, and the redundant session request is sent to the secondary node, so that the secondary node establishes a corresponding redundant session in a redundant user plane resource.

After the master node receives the RUPR information transmitted by the secondary node, a number of RUPRs of the secondary node is determined according to the redundant user plane resource information, and the redundant session request is generated according to the number of RUPRs of the secondary node.

In an example, generating the redundant session request according to the redundant user plane resource information includes: determining a number of redundant user plane resources of the secondary node according to the redundant user plane resource information; and generating the redundant session request according to the number of redundant user plane resources of the secondary node.

In an example, if any one of messages sent by the secondary node does not carry the redundant user plane resource information, then the number of redundant user plane resources of the secondary node is determined to be 1.

If the MN receives a message from the SN, and the message carries the RUPR information of the SN, then the MN may learn that the SN has one or more redundant user plane resources; and if all messages sent by the SN to the MN do not carry the RUPR information of the SN, then the MN defaults that the SN has one redundant user plane resource.

In an example, that the redundant session request is sent to the secondary node by the master node includes: the redundant session request is sent to the secondary node through a secondary node addition request message or a secondary node modification request message.

In an example, the redundant session request includes the identification information of the redundant session. The identification information of the redundant session is configured for identifying that the session is a redundant session, for example, the identification information of the redundant session is configured for establishing the corresponding redundant session in the redundant user plane resource according to the identification information of the redundant session by the secondary node.

In an example, in response to determining that at least two redundant sessions are established in the redundant user plane resource of the secondary node, the redundant session request further includes a redundant sequence number value of the redundant session.

In an example, the corresponding redundant session is established, by the secondary node, in a redundant user plane resource matched with the redundant serial number value of the redundant session according to the identification information of the redundant session in the redundant session request and the redundant serial number value of the redundant session.

In an example, the redundant session request is generated according to the number of redundant user plane resources of the secondary node includes: if the number of redundant user plane resources of the secondary node is equal to one, then the generated redundant session request is configured for instructing the secondary node to establish one redundant session in the redundant user plane resource; and if the number of redundant user plane resources of the secondary node is equal to or greater than two, then the generated redundant session request is configured for instructing the secondary node to establish at least one redundant session in the redundant user plane resource.

According to the redundant session establishment method provided in the present application, the master node may determine the number of RUPRs of the secondary node through the RUPR information transmitted by the secondary node, and then one or more redundant sessions may be established in the secondary node according to the number of RUPRs, so that the reliability of the redundant sessions is ensured, and the reliability of the data transmission in the 5G wireless communication technology is improved.

In an example, after the master node sends the redundant session request to the secondary node, the secondary node sends a response message matched with the redundant session request to the master node after establishing the redundant session corresponding to the redundant session request, further, the master node may receive a response message which is fed back by the secondary node and is matched with the redundant session request; where the response message is used for indicating whether the redundant session corresponding to the redundant session request is successfully established.

In an example, the method further includes: when the master node establishes the redundant session, radio bearers are established with the terminal, where the radio bearers are in one-to-one correspondence with redundant sessions.

If the master node decides to establish a redundant session in the master node itself, a radio bearer corresponding to the redundant session is established with the terminal after the redundant session is established, and the service data of the redundant user plane resource is borne through the radio bearer.

For unexplained parts of the present embodiment, reference is made to the foregoing embodiments, and details are not repeated herein.

Figure 8:
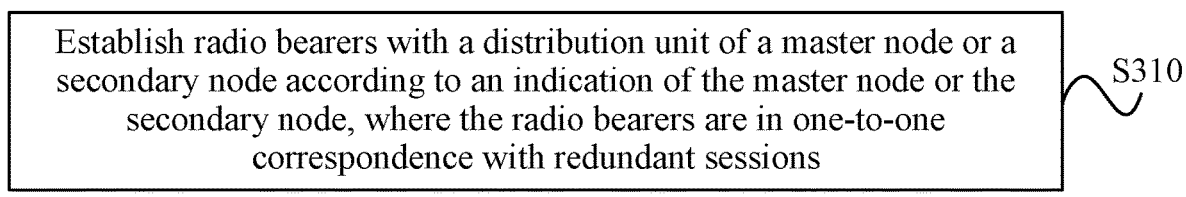
FIG. 8 is a flowchart of a wireless bearer establishment method provided in the present application.

In an exemplary embodiment, FIG. 8 is a flowchart of a wireless bearer establishment method provided in the present application. The method may be applicable to situations where radio bearers are established in dual-connectivity and multi-connectivity architectures. The method may be executed by the radio bearer establishment apparatus provided in the present application, and the radio bearer establishment apparatus may be implemented by software and/or hardware and integrated in the terminal.

As shown in FIG. 8, the radio bearer establishment method provided in the present application includes the following.

In S310, radio bearers are established with a distribution unit of a master node or a secondary node according to an indication of the master node or the secondary node, where the radio bearers are in one-to-one correspondence with redundant sessions.

In a case where the MN and the SN respectively establish a redundant session, the terminal establishes 1 radio bearer with the MN and the SN, respectively, and bears service data of a redundant user plane resource through the radio bearer. A wireless bearer established by the terminal and the MN corresponds to a redundant session established by the MN, and a wireless bearer established by the terminal and the SN corresponds to a redundant session established by the SN.

In a case where the SN establishes multiple redundant sessions, the terminal establishes radio bearers with multiple DUs of the SN, respectively, and bears service data of the redundant user plane resource through the radio bearers. Multiple radio bearers established by the terminal and multiple DUs of the SN are respectively in one-to-one correspondence with the multiple redundant sessions established by the SN.

According to the radio bearer establishment method provided in the present application, the terminal establishes radio bearers with a distribution unit of a master node or a secondary node according to an indication of the master node or the secondary node, where the radio bearers are in one-to-one correspondence with redundant sessions, and transmits a data service through the radio bearer, so that the reliability of the data service is improved.

In an example, that a redundant session is established in the secondary node includes: the master node requests the secondary node to establish the redundant session in a redundant user plane resource according to redundant user plane resource information transmitted by the secondary node.

The redundant user plane resource information is generated by the secondary node, and the redundant user plane resource information is transmitted to the master node; the redundant user plane resource information of the secondary node transmitted by the secondary node is received by the master node, a redundant session request is generated according to the redundant user plane resource information, and the redundant session request is sent to the secondary node; a corresponding redundant session is established by the secondary node in the redundant user plane resource according to the redundant session request from the master node; the secondary node sends a response message matched with the redundant session request to the MN, where the response message includes related information of establishment success and/or establishment failure of one or more redundant sessions; and the master node receives a response message which is sent by the secondary node and is matched with the redundant session request.

In an example, that the redundant session is established in the secondary node includes: the master node determines a number of redundant user plane resources of the secondary node according to the redundant user plane resource information, the master node generates a redundant session request according to the number of redundant user plane resources of the secondary node, and the secondary node is requested to establish the redundant session in the redundant user plane resource according to the redundant session request.

In an example, the redundant session request is sent by the master node to the secondary node through the secondary node addition request message or the secondary node modification request message.

In an example, the redundant user plane resource information includes any one of: a number of redundant user plane connections allowed to be established by a secondary node, a number of redundant user plane bearers allowed to be established by the secondary node, or a number of redundant sessions allowed to be established by the secondary node and having a redundant serial number as a set sequence value.

That is, the redundant user plane resource information sent by the SN means that the SN may establish one or more redundant user plane connections, or the SN may establish one or more redundant user plane bearers, or the SN may establish a redundant session with one or more RSN values.

In an example, the redundant user plane resource information is generated by the secondary node according to the number of redundant user plane resources of the secondary node, where the number of redundant user plane resources includes: a number of distribution units; or a first set value corresponding to a first target number range to which a number of distribution units belongs;

or a minimum value of a number of distributed units and a number of centralized unit control planes; or a second set value corresponding to a second target number range to which a minimum value belongs.

In an example, the secondary node transmits the redundant user plane resource information to the master node through a message sent to the master node by the secondary node; where the message sent to the master node by the secondary node is sent through an interface between the master node and the secondary node.

For example, the message sent by the secondary node to the master node through an Xn interface of the 5G includes the redundant user plane resource information of the secondary node.

In an example, if the redundant user plane resource information is not carried in any of the messages sent by the secondary node to the master node, then the master node determines that the secondary node has one redundant user plane resource.

If the MN receives a message from the SN, and the message carries the RUPR information of the SN, then the MN may learn that the SN has one or more redundant user plane resources; if all messages sent by the SN to the MN do not carry the RUPR information of the SN, then the MN defaults that the SN has one redundant user plane resource, that is, if the secondary node has 1 number of RUPR information, it may also be that the RUPR information is not sent to the master node, and the master node defaults that the secondary node has 1 number of RUPR at this time. In an example, the redundant session request includes the identification information of the redundant session, and the identification information is used for the secondary node to establish a corresponding redundant session in the redundant user plane resource according to the identification information of the redundant session.

After the secondary node receives the redundant session request sent by the master node, a redundant session corresponding to the redundant session request is established in the RUPR.

In an example, when the master node determines to establish at least two sessions in the redundant user plane resource of the secondary node, the redundant session request further includes a redundant serial number value of the redundant session, the redundant serial number value of the redundant session is configured for the secondary node to establish the corresponding redundant session in a redundant user plane resource matched with the redundant serial number value of the redundant session.

If the redundant session request sent by the master node includes the redundant serial number value of the redundant session, the secondary node establishes the redundant session in the RUPR matched with the redundant serial number value.

In an example, that the master node generates the redundant session request according to the number of redundant user plane resources of the secondary node includes: if the number of redundant user plane resources of the secondary node is equal to one, then the generated redundant session request by the master node is configured for instructing the secondary node to establish one redundant session in the redundant user plane resource; and if the number of redundant user plane resources of the secondary node is equal to or greater than two, then the generated redundant session request by the master node is configured for instructing the secondary node to establish at least one redundant session in the redundant user plane resource.

For unexplained parts of the present embodiment, reference is made to the foregoing embodiments, and details are not repeated herein.

Figure 9:
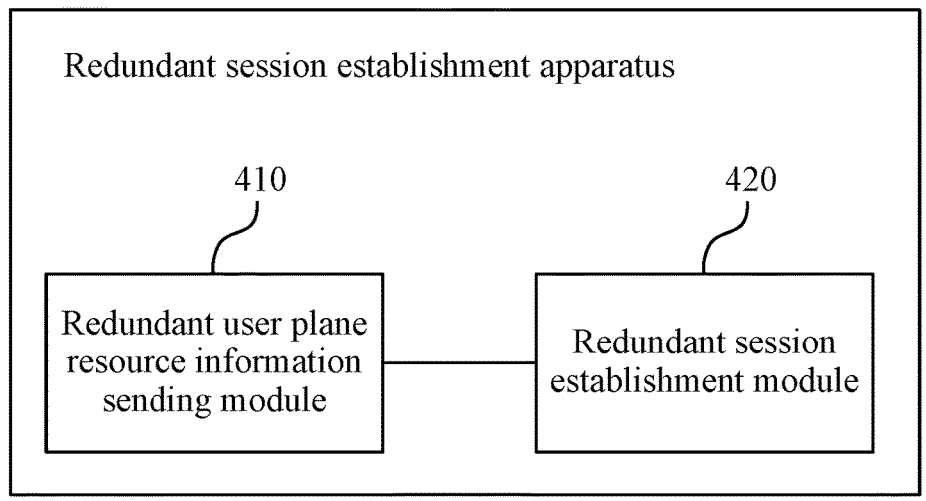
FIG. 9 is a structural diagram of a redundant session establishment apparatus provided in the present application.

This embodiment further provides a redundant session establishment apparatus applied to a secondary node, and FIG. 9 is a schematic structural diagram of a redundant session establishment apparatus provided in the present application, as shown in FIG. 9, the redundant session establishment apparatus applied to the secondary node provided in the embodiments of the present application may be integrated in the secondary node. The apparatus includes a redundant user plane resource information sending module 410 and a redundant session establishment module 420. The redundant user plane resource information sending module 410 is configured to generate redundant user plane resource information, and transmit the redundant user plane resource information to a master node. The redundant session establishment module 420 is configured to establish a redundant session corresponding to a redundant session request in a redundant user plane resource according to the redundant session request from the master node, where the redundant session request is a request generated by the master node according to the redundant user plane resource information.

The redundant session establishment apparatus applied to the secondary node provided in this embodiment is configured for realizing the redundant session establishment method applied to the secondary node described in the embodiments of the present application. The implementation principle and effect of the redundant session establishment apparatus applied to the secondary node provided in this embodiment are similar to those of the redundant session establishment method applied to the secondary node described in the embodiments of the present application, which are not repeated here.

In an example, the redundant user plane resource information sending module 410 is configured to: determine a number of redundant user plane resources; generate the redundant user plane resource information according to the number of redundant user plane resources; and transmit the redundant user plane resource information to the master node.

In an example, the number of redundant user plane resources includes: a number of distribution units; or a first set value corresponding to a first target number range to which a number of distribution units belongs; or a minimum value of a number of distributed units and a number of centralized unit control planes; or a second set value corresponding to a second target number range to which a minimum value belongs.

In an example, the redundant user plane resource information includes any one of: a number of redundant user plane connections allowed to be established by a secondary node, a number of redundant user plane bearers allowed to be established by the secondary node, or a number of redundant sessions allowed to be established by the secondary node and having a redundant serial number as a set sequence value.

In an example, identification information of the redundant session is included in the redundant session request.

In an example, the redundant session establishment module 420 is configured to establish the redundant session corresponding to the redundant session request in the redundant user plane resource according to the identification information of the redundant session in the redundant session request.

In an example, the redundant session establishment module 420 is configured to: establish the redundant session in any one redundant user plane resource if it is determined that only one redundant session is established in the redundant user plane resource according to the redundant session request.

In an example, when the master node determines to establish at least two redundant sessions in the redundant user plane resource of the secondary node, the redundant session request further includes a redundant serial number value of a redundant session.

In an example, the redundant session establishment module 420 is configured to establish the redundant session corresponding to the redundant session request in a redundant user plane resource matched with the redundant serial number value of the redundant session according to the identification information of the redundant session in the redundant session request and the redundant serial number value of the redundant session.

In an example, the redundant session request is sent by the master node through a secondary node addition request message or a secondary node modification request message.

In an example, the apparatus described above further includes a response sending module, the response sending module is configured to feed back a response message matched with the redundant session request to the master node after the redundant session corresponding to the redundant session request is established in the redundant user plane resource; where the response message is configured for indicating whether the redundant session corresponding to the redundant session request is successfully established.

In an example, the redundant user plane resource information sending module 410 is configured to generate redundant user plane resource information and transmit a message sent to the master node by a secondary node in the redundant user plane resource information to the master node; where the message sent to the master node by the secondary node is sent through an interface between the master node and the secondary node.

In an example, the above apparatus further includes a radio bearer establishment module. The radio bearer establishment module is configured to establish radio bearers with the terminal through at least one distribution unit after the redundant session corresponding to the redundant session request is established in the redundant user plane resource, where the radio bearers are in one-to-one correspondence with redundant sessions.

Figure 10:
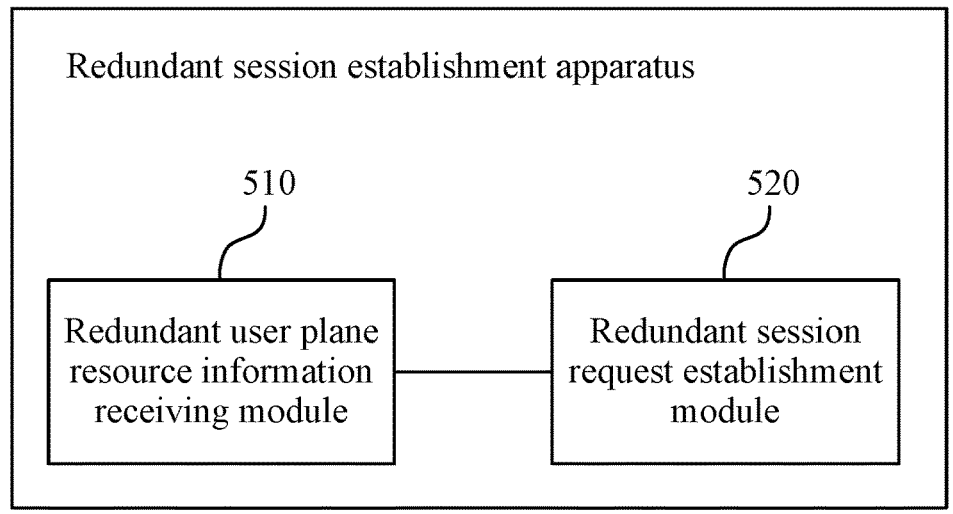
FIG. 10 is a structural diagram of a redundant session establishment apparatus provided in the present application.

This embodiment further provides a redundant session establishment apparatus applied to a master node, and FIG. 10 is a schematic structural diagram of a redundant session establishment apparatus provided in the present application, as shown in FIG. 10, the redundant session establishment apparatus applied to the master node provided in the embodiments of the present application may be integrated in the master node. The apparatus includes a redundant user plane resource information receiving module 510 and a redundant session request establishment module 520. The redundant user plane resource information receiving module 510 is configured to receive redundant user plane resource information of a secondary node transmitted by the secondary node. The redundant session request establishment module 520 is configured to generate a redundant session request according to the redundant user plane resource information, and send the redundant session request to the secondary node, so that the secondary node establishes a redundant session corresponding to the redundant session request in a redundant user plane resource.

The redundant session establishment apparatus applied to the master node provided in this embodiment is configured for realizing the redundant session establishment method applied to the master node described in the embodiments of the present application. The implementation principle and effect of the redundant session establishment apparatus applied to the master node provided in this embodiment are similar to those of the redundant session establishment method applied to the master node described in the embodiments of the present application, which are not repeated here.

In an example, the redundant session request establishment module 520 includes a determination unit for determining a number of redundant user plane resources and a redundant session request generation unit. The determination unit for determining the number of redundant user plane resources is configured to determine a number of redundant user plane resources of the secondary node according to the redundant user plane resource information. The redundant session request generation unit is configured to generate the redundant session request according to the number of redundant user plane resources of the secondary node.

In an example, the redundant session request generation unit is configured to as follows: if the number of redundant user plane resources of the secondary node is equal to one, then the generated redundant session request is configured for instructing the secondary node to establish one redundant session in the redundant user plane resource; and if the number of redundant user plane resources of the secondary node is equal to or greater than two, then the generated redundant session request is configured for instructing the secondary node to establish at least one redundant session in the redundant user plane resource.

In an example, the redundant session request generation unit is further configured to as follows: if any one of messages sent by the secondary node does not carry the redundant user plane resource information, then the number of redundant user plane resources of the secondary node is determined to be 1.

In an example, the redundant user plane resource information includes any one of: a number of redundant user plane connections allowed to be established by a secondary node, a number of redundant user plane bearers allowed to be established by the secondary node, or a number of redundant sessions allowed to be established by the secondary node and having a redundant serial number as a set sequence value.

In an example, the redundant session request includes identification information of the redundant session.

In an example, in response to determining that at least two redundant sessions are established in the redundant user plane resource of the secondary node, the redundant session request further includes a redundant sequence number value of the redundant session.

In an example, the above apparatus further includes a response receiving module. The response receiving module is configured to receive a response message which is fed back by the secondary node and is matched with the redundant session request; where the response message is configured for indicating whether the redundant session corresponding to the redundant session request is successfully established.

In an example, the redundant session request establishment module 520 is configured to generate a redundant session request according to the redundant user plane resource information and sending the redundant session request to the secondary node through the secondary node addition request message or the secondary node modification request message, so that the secondary node establishes a redundant session corresponding to the redundant session request in a redundant user plane resource.

In an example, the redundant user plane resource information receiving module 510 is configured to receive the redundant user plane resource information of the secondary node transmitted by the secondary node through a message sent to a master node; where the message sent by the secondary node to the master node is sent through an interface between the master node and the secondary node.

Figure 11:
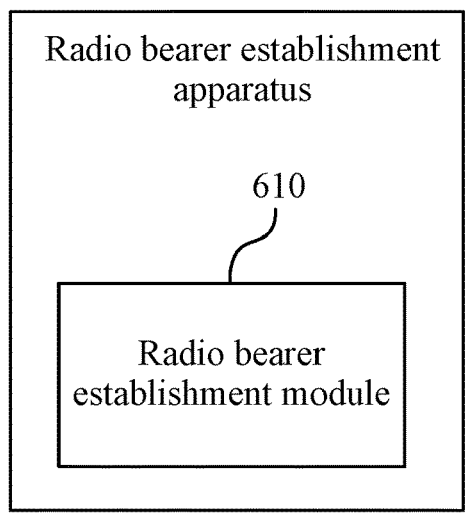
FIG. 11 is a structural diagram of a wireless bearer establishment apparatus provided in the present application.

This embodiment further provides a radio bearer establishment apparatus, and FIG. 11 is a schematic structural diagram of a radio bearer establishment apparatus provided in the present application, as shown in FIG. 11, the radio bearer establishment apparatus provided in the embodiments of the present application may be integrated in a terminal. The apparatus includes a radio bearer establishment module 610. The radio bearer establishment module 610 is configured to establish radio bearers with a distribution unit of a master node or a secondary node according to an indication of the master node or the secondary node, where the radio bearers are in one-to-one correspondence with redundant sessions.

The radio bearer establishment apparatus provided in this embodiment is configured for realizing the radio bearer establishment method described in the embodiments of the present application. The implementation principle and effect of the radio bearer establishment apparatus provided in this embodiment are similar to those of the radio bearer establishment method described in the embodiments of the present application, which are not repeated here.

In an example, that a redundant session is established in the secondary node includes: the master node requests the secondary node to establish the redundant session in a redundant user plane resource according to redundant user plane resource information transmitted by the secondary node.

In an example, that the redundant session is established in the secondary node includes: the master node determines a number of redundant user plane resources of the secondary node according to the redundant user plane resource information, the master node generates a redundant session request according to the number of redundant user plane resources of the secondary node, and the secondary node is requested to establish the redundant session in the redundant user plane resource according to the redundant session request.

In an example, that the master node generates the redundant session request according to the number of redundant user plane resources of the secondary node includes: if the number of redundant user plane resources of the secondary node is equal to one, then the generated redundant session request by the master node is configured for instructing the secondary node to establish one redundant session in the redundant user plane resource; and if the number of redundant user plane resources of the secondary node is equal to or greater than two, then the generated redundant session request by the master node is configured for instructing the secondary node to establish at least one redundant session in the redundant user plane resource.

In an example, if any one of messages sent by the secondary node to the master node do not carry the redundant user plane resource information, then the master node determines the number of redundant user plane resources of the secondary node to be equal to one.

In an example, the redundant session request includes identification information of the redundant session, the identification information is configured for the secondary node to establish a redundant session corresponding to the redundant session request in the redundant user plane resource according to the identification information of the redundant session.

In an example, when the master node determines to establish at least two redundant sessions in the redundant user plane resource of the secondary node, the redundant session request further includes a redundant serial number value of the redundant session, the redundant serial number value of the redundant session is configured for the secondary node to establish the redundant session corresponding to the redundant session request in a redundant user plane resource matched with the redundant serial number value of the redundant session.

In an example, the redundant session request is sent by the master node to the secondary node through the secondary node addition request message or the secondary node modification request message.

In an example, the redundant user plane resource information includes any one of: a number of redundant user plane connections allowed to be established by a secondary node, a number of redundant user plane bearers allowed to be established by the secondary node, or a number of redundant sessions allowed to be established by the secondary node and having a redundant serial number as a set sequence value.

In an example, the redundant user plane resource information is generated according to a number of redundant user plane resources, where the number of redundant user plane resources includes: a number of distribution units; or a first set value corresponding to a first target number range to which a number of distribution units belongs; or a minimum value of a number of distributed units and a number of centralized unit control planes; or a second set value corresponding to a second target number range to which a minimum value belongs.

Figure 12:
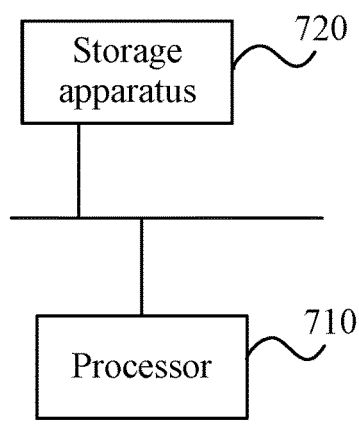
FIG. 12 is a structural diagram of a secondary node provided in the present application.

An embodiment of the present application provides a secondary node, and FIG. 12 is a schematic structural diagram of a secondary node provided in the present application, as shown in FIG. 12, the secondary node provided in the present application includes: one or more processors 710 and a storage apparatus 720; the processor 710 of an integrated access and backhaul node (IAB) may be one or more, and one processor 710 is used as an example in FIG. 12; the storage apparatus 720 is configured for storing one or more programs; the one or more programs are executed by the one or more processors 710 so that the one or more processors 710 implement the redundant session establishment method applied to the secondary node as described in the embodiments of the present application.

The processor 710 and the storage apparatus 720 in the secondary node may be connected by a bus or other manners, and FIG. 12 shows the connection by a bus as an example.

The storage apparatus 720, as a computer readable storage medium, may be configured to store a software program, a computer executable program, and a module, such as a program instruction/module (e.g., a redundant user plane resource information sending module 410 and a redundant session establishment module 420 in the redundant session establishment apparatus applied to the secondary node) corresponding to the redundant session establishment method applied to the secondary node as described in the embodiments of the present application. The storage apparatus 720 may include a storage program region and a storage data region, where the storage program region may store an operating system, an application program required for at least one function; the storage data region may store data created according to use of the device, or the like. In addition, the storage apparatus 720 may include a high-speed random access memory and may also include a non-volatile memory, such as at least one magnetic disk storage device, a flash memory device, or other non-volatile solid-state memory devices. In some instances, the storage apparatus 720 may include a memory disposed remotely with respect to the processor 710, which remote memory may be connected to a first node over a network. Examples of such networks include, but are not limited to, the Internet, an intranet, a local area network, a mobile communication network, and combinations thereof.

Figure 13:
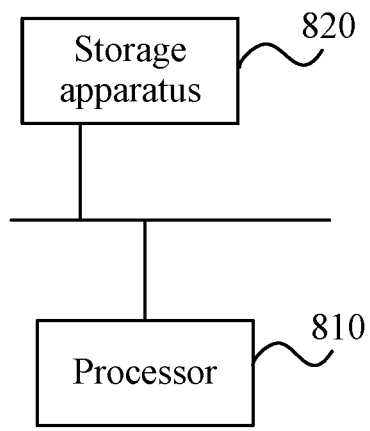
FIG. 13 is a structural diagram of a master node provided in the present application.

An embodiment of the present application provides a master node, and FIG. 13 is a structural diagram of the master node provided in the present application, and as shown in FIG. 13, the master node provided in the present application includes one or more processors 810 and a storage apparatus 820. A number of processors 810 of the master node may be one or more, and one processor 810 is used as an example in FIG. 13; the storage apparatus 820 is configured for storing one or more programs; the one or more programs are executed by the one or more processors 810 to cause the one or more processors 810 to implement a redundant session establishment method applied to the master node as described in the embodiments of the present application.

The processor 810 and the storage apparatus 820 in the master node may be connected by a bus or other manners, and FIG. 13 shows the connection by a bus as an example.

The storage apparatus 820, as a computer readable storage medium, may be configured to store a software program, a computer executable program, and a module, such as a program instruction/module (e.g., a redundant user plane resource information receiving module 510 and a redundant session request establishment module 520 applied to the redundant session establishment apparatus of the master node) corresponding to the redundant session establishment method applied to the master node as described in the embodiments of the present application.

The storage apparatus 820 may include a storage program region and a storage data region, where the storage program region may store an operating system, an application program required for at least one function; the storage data region may store data created according to use of the device, or the like. In addition, the storage apparatus 820 may include a high-speed random access memory and may also include a non-volatile memory, such as at least one magnetic disk storage device, a flash memory device, or other non-volatile solid-state memory devices. In some instances, the storage apparatus 820 may include a memory disposed remotely with respect to the processor 810, which remote memory may be connected to a first node over a network. Examples of such networks include, but are not limited to, the Internet, an intranet, a local area network, a mobile communication network, and combinations thereof.

Figure 14:
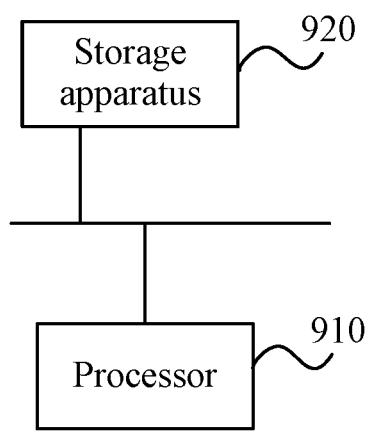
FIG. 14 is a structural diagram of a terminal structure provided in the present application.

An embodiment of the present application provides a terminal, FIG. 14 is a schematic structural diagram of a terminal structure provided in the present application, and as shown in FIG. 14, the terminal provided in the present application includes one or more processors 910 and a storage apparatus 920. A number of processors 910 of the terminal may be one or more, and one processor 910 is used as an example in FIG. 14; the storage apparatus 920 is configured for storing one or more programs; the one or more programs are executed by the one or more processors 910 to cause the one or more processors 910 to implement the radio bearer establishment method as described herein.

The processor 910 and the storage apparatus 920 in the terminal may be connected by a bus or other manners, and FIG. 14 shows the connection by a bus as an example.

The storage apparatus 920, as a computer readable storage medium, may be configured to store a software program, a computer-executable program, and a module, such as a program instruction/module (e.g., a radio bearer establishment module 610 in the radio bearer establishment apparatus) corresponding to the radio bearer establishment method as described in the embodiments of the present application. The storage apparatus 920 may include a storage program region and a storage data region, where the storage program region may store an operating system, an application program required for at least one function; the storage data region may store data created according to use of the device, or the like. In addition, the storage apparatus 920 may include a high-speed random access memory and may also include a non-volatile memory, such as at least one magnetic disk storage device, a flash memory device, or other non-volatile solid-state memory devices. In some instances, the storage apparatus 920 may include a memory remotely disposed with respect to the processor 910, which remote memory may be connected to a first node over a network. Examples of such networks include, but are not limited to, the Internet, an intranet, a local area network, a mobile communication network, and combinations thereof.

An embodiment of the present application further provides a storage medium, and the storage medium stores a computer program. The computer program, when executed by a processor, implements the redundant session establishment method applied to a secondary node in any one of the embodiments of the present application, or the redundant session establishment method applied to a master node in any one of the embodiments of the present application, or the radio bearer establishment method in any one of the embodiments of the present application.

The redundant session establishment method applied to the secondary node includes the following. Redundant user plane resource information is generated, and the redundant user plane resource information is transmitted to a master node; and a redundant session corresponding to a redundant session request is established in a redundant user plane resource according to the redundant session request from the master node, where the redundant session request is a request generated by the master node according to the redundant user plane resource information.

The redundant session establishment method applied to the master node includes the following. Redundant user plane resource information of a secondary node transmitted by the secondary node is received; and a redundant session request is generated according to the redundant user plane resource information, and the redundant session request is sent to the secondary node, so that the secondary node establishes a redundant session corresponding to the redundant session request in a redundant user plane resource.

The radio bearer establishment method includes: radio bearers are established with a distribution unit of the master node or the secondary node according to an indication of a master node or a secondary node, where the radio bearers are in one-to-one correspondence with redundant sessions.

The term terminal encompasses any suitable type of wireless user equipment, such as a mobile telephone, a portable data processing apparatus, a portable web browser, or an in-vehicle mobile station.

In general, various embodiments of the present application may be implemented in hardware or special purpose circuits, software, logic or any combination thereof. For example, some aspects may be implemented in hardware, while other aspects may be implemented in firmware or software which may be executed by a controller, microprocessor or other computing device, although the present application is not limited thereto.

Embodiments of the present application may be implemented by a data processor of a mobile device executing computer program instructions, for example in a processor entity, or by hardware, or by a combination of software and hardware. The computer program instructions may be assembler instructions, instruction set architecture (ISA) instructions, machine instructions, machine-related instructions, microcode, firmware instructions, state setting data, or source or object codes written in any combination of one or more programming languages.

Any block diagram of the logic flow in the accompanying drawings of the present application may represent program steps, or may represent interconnected logic circuits, modules, and functions, or may represent a combination of program steps and logic circuits, modules, and functions. The computer program may be stored on a memory. The memory may be of any type suitable for the local technical environment and may be implemented using any suitable data storage technology, such as, but not limited to, a read-only memory (ROM), an RANdom access memory (RAM), an optical memory device and system (digital versatile disc (DVD) or compact disk (CD)), etc. Computer readable media may include non-instantaneous storage media. Data processors may be of any type suitable for the local technical environment, such as, but not limited to, general-purpose computers, specialized computers, microprocessors, digital signal processors (DSP), application specific integrated circuits (ASIC), field-programmable gate array (FPGA)), and processors based on multi-core processor architectures.

What is claimed is:

1. A redundant session establishment method, comprising:
   generating redundant user plane resource information, and transmitting the redundant user plane resource information to a master node; and
   establishing a redundant session corresponding to a redundant session request in a redundant user plane resource according to the redundant session request from the master node, wherein the redundant session request is a request generated by the master node according to the redundant user plane resource information;
   wherein the redundant user plane resource refers to a user plane resource that establishes the redundant session, and the redundant user plane resource information refers to information generated according to the number of redundant user plane resources of a secondary node and is used for the secondary node to indicate the number of the redundant user plane resources of the secondary node to the master node;
   wherein identification information of the redundant session is comprised in the redundant session request;
   wherein in a case where the master node determines to establish at least two redundant sessions in the redundant user plane resource of the secondary node, the redundant session request further comprises a redundant serial number value of a redundant session;
   wherein the establishing the redundant session corresponding to the redundant session request in the redundant user plane resource according to the redundant session request from the master node comprises:
   establishing the redundant session corresponding to the redundant session request in a redundant user plane resource matched with the redundant serial number value of the redundant session according to the identification information of the redundant session in the redundant session request and the redundant serial number value of the redundant session.

2. The method of claim 1, wherein the generating the redundant user plane resource information comprises:
   determining a number of redundant user plane resources; and
   generating the redundant user plane resource information according to the number of redundant user plane resources.

3. The method of claim 2, wherein the number of redundant user plane resources comprises one of:
   a number of distribution units;
   a first set value corresponding to a first target number range to which a number of distribution units belongs;
   a minimum value of a number of distributed units and a number of centralized unit control planes; or
   a second set value corresponding to a second target number range to which a minimum value of a number of distribution units and a number of centralized unit control planes belongs.

4. The method of claim 1, wherein the redundant user plane resource information comprises one of:
   a number of redundant user plane connections allowed to be established by the secondary node, a number of redundant user plane bearers allowed to be established by the secondary node, or a number of redundant sessions allowed to be established by the secondary node and having a redundant serial number as a set sequence value.

5. The method of claim 1, wherein the establishing the redundant session corresponding to the redundant session request in the redundant user plane resource according to the redundant session request from the master node comprises:
   establishing the redundant session corresponding to the redundant session request in the redundant user plane resource according to the identification information of the redundant session in the redundant session request.

6. The method of claim 5, wherein the establishing the redundant session corresponding to the redundant session request in the redundant user plane resource according to the redundant session request from the master node comprises:
   in response to determining that one redundant session is established in the redundant user plane resource according to the redundant session request and a number of redundant user plane resources is greater than one, establishing the redundant session in one redundant user plane resource of the plurality of redundant user plane resources.

7. The method of claim 1, wherein the redundant session request is sent by the master node through a secondary node addition request message or a secondary node modification request message.

8. The method of claim 1, wherein after the establishing the redundant session corresponding to the redundant session request in the redundant user plane resource, the method further comprises:
feeding back a response message matched with the redundant session request to the master node;
wherein the response message is configured for indicating whether the redundant session corresponding to the redundant session request is successfully established.

9. The method of claim 1, wherein the transmitting the redundant user plane resource information to the master node comprises:
transmitting a message sent to the master node by a secondary node in the redundant user plane resource information to the master node;
wherein the message sent to the master node by the secondary node is sent through an interface between the master node and the secondary node.

10. The method of claim 1, wherein after the establishing the redundant session corresponding to the redundant session request in the redundant user plane resource, the method further comprises:
establishing radio bearers in one-to-one correspondence with redundant sessions with the terminal through at least one distribution unit.

11. A secondary node, comprising:
at least one processor;
a storage apparatus, which is configured to store at least one program;
wherein the at least one program, when executed by the at least one processor, causes the at least one processor to implement the redundant session establishment method of claim 1.

12. A redundant session establishment method, comprising:
receiving redundant user plane resource information of a secondary node transmitted by the secondary node; and
generating a redundant session request according to the redundant user plane resource information, and sending the redundant session request to the secondary node, so that the secondary node establishes a redundant session corresponding to the redundant session request in a redundant user plane resource;
wherein the redundant user plane resource refers to a user plane resource that establishes the redundant session, and the redundant user plane resource information refers to information generated according to the number of redundant user plane resources of the secondary node and is used for the secondary node to indicate the number of the redundant user plane resources of the secondary node to a master node;
wherein the generating the redundant session request according to the redundant user plane resource information comprises:
determining a number of redundant user plane resources of the secondary node according to the redundant user plane resource information; and
generating the redundant session request according to the number of redundant user plane resources of the secondary node;
wherein the generating the redundant session request according to the number of redundant user plane resources of the secondary node comprises:

in a case where the number of redundant user plane resources of the secondary node is equal to one, the generated redundant session request is configured for instructing the secondary node to establish one redundant session in the redundant user plane resource; and
in a case where the number of redundant user plane resources of the secondary node is equal to or greater than two, the generated redundant session request is configured for instructing the secondary node to establish at least one redundant session in the redundant user plane resource.

13. The method of claim 12, further comprising:
in a case where all messages sent by the secondary node do not carry the redundant user plane resource information, determining that the number of redundant user plane resources of the secondary node is equal to one.

14. The method of claim 12, wherein the redundant user plane resource information comprises one of:
a number of redundant user plane connections allowed to be established by the secondary node, a number of redundant user plane bearers allowed to be established by the secondary node, or a number of redundant sessions allowed to be established by the secondary node and having a redundant serial number as a set sequence value.

15. The method of claim 12, wherein identification information of the redundant session is comprised in the redundant session request.

16. The method of claim 15, wherein in response to determining that at least two redundant sessions are established in the redundant user plane resource of the secondary node, the redundant session request further comprises a redundant sequence number value of the redundant session.

17. The method of claim 12, after the sending the redundant session request to the secondary node, the method further comprises:
receiving a response message which is fed back by the secondary node and is matched with the redundant session request;
wherein the response message is configured for indicating whether the redundant session corresponding to the redundant session request is successfully established.

18. The method of claim 12, wherein the sending the redundant session request to the secondary node comprises:
sending the redundant session request to the secondary node through a secondary node addition request message or a secondary node modification request message.

19. The method of claim 12, wherein the receiving the redundant user plane resource information of the secondary node transmitted by the secondary node comprises:
receiving the redundant user plane resource information of the secondary node transmitted by the secondary node through a message sent to the master node;
wherein the message sent by the secondary node to the master node is sent through an interface between the master node and the secondary node.

20. A master node, comprising:
at least one processor;
a storage apparatus, which is configured to store at least one program;
wherein the at least one program, when executed by the at least one processor, causes the at least one processor to implement the redundant session establishment method of claim 12.

21. A radio bearer establishment method, comprising:
establishing radio bearers with a distribution unit of a secondary node according to an indication of the master node, wherein the radio bearers are in one-to-one correspondence with redundant sessions;
wherein establishing a redundant session in the secondary node comprises: requesting, by the master node, the secondary node to establish the redundant session in a redundant user plane resource according to redundant user plane resource information transmitted by the secondary node;
wherein the redundant user plane resource refers to a user plane resource that establishes the redundant session, and the redundant user plane resource information refers to information generated according to the number of redundant user plane resources of the secondary node and is used for the secondary node to indicate the number of the redundant user plane resources of the secondary node to the master node;
wherein the establishing the redundant session in the secondary node comprises:
determining, by the master node, a number of redundant user plane resources of the secondary node according to the redundant user plane resource information;
generating, by the master node, a redundant session request according to the number of redundant user plane resources of the secondary node; and
requesting the secondary node to establish the redundant session in the redundant user plane resource according to the redundant session request;
wherein the redundant session request comprises identification information of the redundant session, the identification information is configured for the secondary node to establish a redundant session corresponding to the redundant session request in the redundant user plane resource according to the identification information of the redundant session;
wherein in a case where the master node determines to establish at least two redundant sessions in the redundant user plane resource of the secondary node, the redundant session request further comprises a redundant serial number value of the redundant session, the redundant serial number value of the redundant session is configured for the secondary node to establish the redundant session corresponding to the redundant session request in a redundant user plane resource matched with the redundant serial number value of the redundant session.

22. The method of claim 21, wherein the generating, by the master node, the redundant session request according to the number of redundant user plane resources of the secondary node, comprises:

in a case where the number of redundant user plane resources of the secondary node is equal to one, configuring the generated redundant session request by the master node for instructing the secondary node to establish one redundant session in the redundant user plane resource; and
in a case where the number of redundant user plane resources of the secondary node is equal to or greater than two, configuring the generated redundant session request by the master node for instructing the secondary node to establish at least one redundant session in the redundant user plane resource.

23. The method of claim 22, further comprising:
in a case where all messages sent by the secondary node to the master node do not carry the redundant user plane resource information, determining, by the master node, the number of redundant user plane resources of the secondary node to be equal to one.

24. The method of claim 21, wherein the redundant session request is sent by the master node to the secondary node through a secondary node addition request message or a secondary node modification request message.

25. The method of claim 21, wherein the redundant user plane resource information comprises one of:
a number of redundant user plane connections allowed to be established by the secondary node, a number of redundant user plane bearers allowed to be established by the secondary node, or a number of redundant sessions allowed to be established by the secondary node and having a redundant serial number as a set sequence value.

26. The method of claim 21, wherein the redundant user plane resource information is generated according to a number of redundant user plane resources, wherein the number of redundant user plane resources comprises one of:
a number of distribution units;
a first set value corresponding to a first target number range to which a number of distribution units belongs;
a minimum value of a number of distributed units and a number of centralized unit control planes; or
a second set value corresponding to a second target number range to which a minimum value of a number of distribution units and a number of centralized unit control planes belongs.

27. A terminal, comprising:
at least one processor;
a storage apparatus, which is configured to store at least one program;
wherein the at least one program, when executed by the at least one processor, causes the at least one processor to implement the radio bearer establishment method of claim 21.

* * * * *